United States Patent [19]

Kuwajima

[11] Patent Number: 4,728,423
[45] Date of Patent: Mar. 1, 1988

[54] PLURAL CYLINDRICAL FILTER UNITS WITH DISPLACEMENT SUPPORT

[75] Inventor: Soichi Kuwajima, Urawa, Japan

[73] Assignee: Nihon Schumacher Kabushiki Kaisha, Tokyo, Japan

[21] Appl. No.: 887,021

[22] Filed: Jul. 16, 1986

[30] Foreign Application Priority Data

Jul. 17, 1985 [JP] Japan .................................. 60-155991

[51] Int. Cl.$^4$ ........................ B01D 29/26; B01D 29/32
[52] U.S. Cl. .................................. 210/323.2; 210/346; 210/438; 210/486; 210/497.01; 55/484
[58] Field of Search ..................... 210/323.2, 331, 332, 210/346, 418, 439, 461, 486, 497.01, 438; 55/484

[56] References Cited

U.S. PATENT DOCUMENTS

| | | | |
|---|---|---|---|
| 2,772,786 | 12/1956 | Gardes | 210/323.2 |
| 2,811,220 | 10/1957 | Winslow | 210/323.2 |
| 3,017,032 | 1/1962 | Urdanoff | 210/323.2 |
| 3,406,831 | 10/1968 | Bush et al. | 210/438 |
| 4,267,039 | 5/1981 | Ryan | 210/323.2 |
| 4,526,688 | 7/1985 | Schmidt, Jr. et al. | 210/323.2 |
| 4,604,201 | 8/1986 | Müller | 210/323.2 |

FOREIGN PATENT DOCUMENTS

| | | | |
|---|---|---|---|
| 542293 | 6/1957 | Canada | 210/323.2 |
| 20122 | 4/1882 | Fed. Rep. of Germany | 210/323.2 |
| 1917306 | 4/1969 | Fed. Rep. of Germany | 210/323.2 |
| 2118405 | 10/1972 | Fed. Rep. of Germany | 210/323.2 |
| 12586 | 6/1901 | United Kingdom | 210/323.2 |

*Primary Examiner*—Richard V. Fisher
*Assistant Examiner*—Wanda L. Millard
*Attorney, Agent, or Firm*—Martin Smolowitz

[57] ABSTRACT

A filter element for use in a filter apparatus comprises a plurality of cylindrical filter units coaxially aligned end-to-end to form an integral tubular structure, a top end cap and a bottom end cap on the upper opening and the lower opening, respectively, of said tubular structure, and a cylindrical displacement member disposed coaxially within the tubular structure with a small clearance therebetween.

5 Claims, 5 Drawing Figures

PLURAL CYLINDRICAL FILTER UNITS WITH DISPLACEMENT SUPPORT

BACKGROUND OF THE INVENTION

The present invention relates to a filter apparatus, and more particularly, to a filter element for use in a filter apparatus.

A wide variety of filter apparatuses are generally in use for the manufacture of various products including sugar, beer and the like. In one example of such a filter, a plurality of elongated filter elements are placed in parallel in a tank, each element being connected at its lower end to a collecting tube. The filter elements are all spaced substantially equally apart from each other, and a row of filter elements connected together by a common collecting tube is staggered from an adjoining row of filter elements also connected by a common collecting tube.

In filtering operations, it was known to feed the liquid to be filtered from an inlet tube into the tank and fill the tank to a level such that the filtering elements are all submerged in the liquid. The liquid thus passes through the perforated surfaces of each filtering element, flows down to the bottom of the filter element, and reaches the collecting tube. The collecting tubes thus collect the filtrate and transfer it for a further process or step.

One such elongated filtering element includes a plurality of cylindrical filter units stacked coaxially end-to-end with a gasket interposed therebetween adjacent filter units. The top end of the filter element is provided with a top end cap for closing the end opening of the filter element. Likewise, the bottom end of the filter assembly is fixed to a bottom end cap for closing the bottom end opening of the filter element. The bottom end cap has a plurality of openings or apertures for allowing the filtrate to pass therethrough to the collecting tube.

Substantially at the center of both the top end and bottom end caps is fixedly provided a central shaft extending along the axis of the cylindrical filter units and further extending upward beyond the top end cap. The upper end portion of the central shaft is provided with screw threads for connection with a nut. By rotating the nut, the top end cap can be caused to apply compression over the top end of the stack of cylindrical filter units and, at the same time, establish firm connections between the components of filter element.

In the above-described filter element, however, since the central shaft is positioned in the center of the filter assembly there is a considerably large space between the central shaft and the inner wall surface of the stack of cylindrical filter units. In the cleaning operation of the filter element, a reversed air flow from a compressed air source under pressure (approximately 4.5 kg/cm$^2$), is blown into the interior of the filter units from the bottom apertures (called "backwashing"). In this process, the air under pressure in the first place is used to expand the internal volume of the cylindrical filter units and then at a reduced pressure to operate upon the inner surface. However, the pressure exerted upon the inner surface is not large enough to remove the filter cake deposited upon the outer surface of the filter units or to discharge the filtrate out of the filter units. In addition, a large quantity of air under pressure has been needed for the backwashing purposes. A similar drawback existed with respect to the use of a liquid for reversed liquid flow cleaning operation.

In another aspect, because of the fact that the internal space of the filter element contains a large volume of air, it often happens that after filtering proteinaceous liquids, such as soy sauce, Japanese sake, and beer, black dirt and grime are produced as a result of the contact between the air and the fermentative liquid, and such dirt or grime is apt to become a source of bacterial growth.

SUMMARY OF THE INVENTION

Accordingly, it is the principal object of the present invention to provide an improved filter element for use in filter apparatus in which the above-described problems have been overcome.

It is another object of the invention to provide an improved filter element for use in a filter apparatus which permits the filtrate to flow down along the inner surface of the cylindrical filter units at a substantially increased rate so that no black dirt or grime can deposit upon the inner surface of the filter.

It is still another object of the present invention to provide an improved filter element for use in filter apparatus which precludes entry thereinto of a large volume of air, and at the same time, provides a substantially equal pressure distribution along the axial direction of the filter element.

In keeping with these objects, and with others which will become apparent hereinafter, a feature of the present invention resides in a filter element for use in a filter apparatus comprising a plurality of cylindrical filter units coaxially stacked end-to-end to form a tubular structure, the plurality of cylindrical filter units being provided with a top end cap on the upper end opening of the topmost filter unit, and a bottom end cap having a number of bottom apertures on the lower end opening of the tubular structure.

The filter element in accordance with the current invention further includes a hollow cylindrical displacement member which extends along substantially the entire length of the interior of the tubular structure of the cylindrical filter units, the displacement member being disposed between the top and bottom end caps.

The cylindrical outer surface of the displacement member is in close proximity to the inner wall surface of the tubular structure, whereby a considerably small space is left therebetween. The upper end cap and the bottom end cap are connected together by means of the displacement member, the top end cap being fixed on the upper surface of the displacement member and the bottom end cap being fixed to the bottom surface thereof.

DETAILED DESCRIPTION

Figures 1, 2:
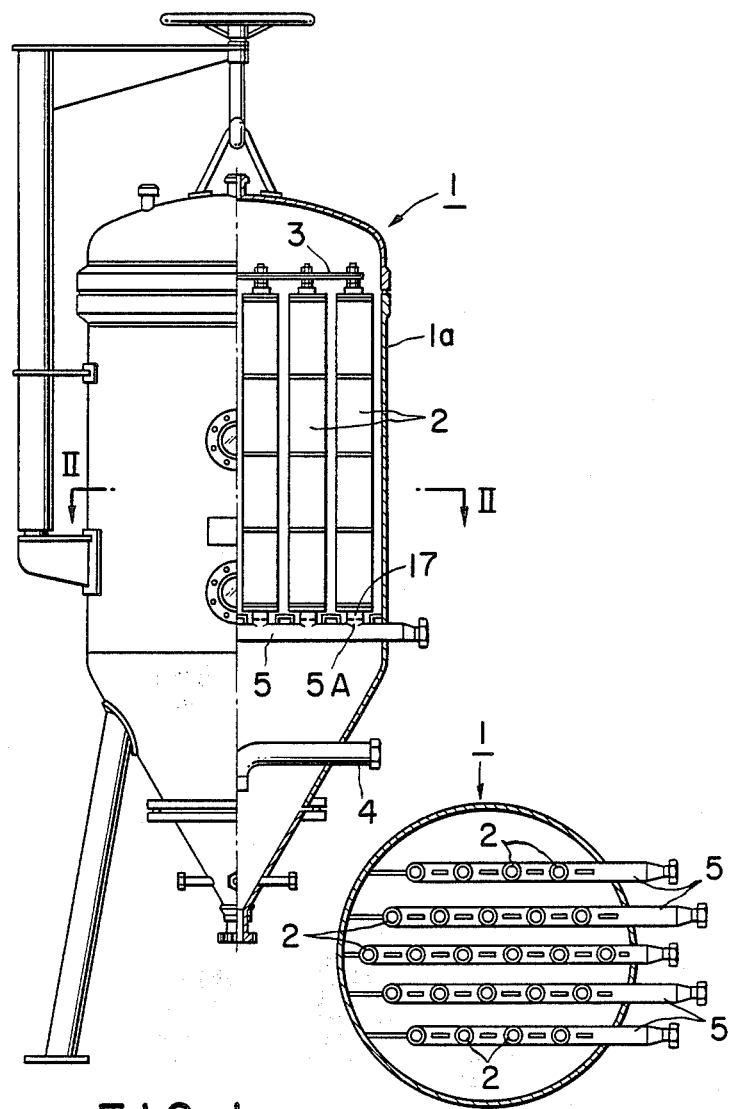
FIG. 1 is an elevational view, with a part shown in vertical section, of a filter apparatus in which filter elements in accordance with this invention are used.
FIG. 2 is a horizontal section taken along the plane indicated by the line II—II in FIG. 1.

Referring now to FIGS. 1 and 2, a filter apparatus generally indicated by the reference numeral 1 has a tank or closed vessel 1a containing a plurality of elongated filter elements 2 which are supported vertically and parallely and aligned in parallel rows. The filter elements 2 of each row are connected at their bottom ends to a common collecting tube 5 at specific intervals. Several collecting tubes 5 are provided in parallel in the filter apparatus 1 with a spacing interval substantially equal to the interval between adjacent filter elements 2. The filter elements 2 of each collecting tube 5 are in staggered positions relative to the filter elements of the adjacent row, so that if viewed in a horizontal cross section each filter element 2 forms a vertex of a substantially equilateral triangle. Also, each row of filter elements 2 is connected at their upper ends to a common support plate 3. Toward the bottom of the filter apparatus 1, an inlet pipe 4 is provided for introducing the liquid to be filtered.

In the use of the above-described filter apparatus 1, the liquid to be filtered flows into the apparatus through the inlet pipe 4. As the liquid continues to enter the tank, the surface of the liquid moves upward and encircles the filter elements 2. Consequently, the liquid passes through the perforated surfaces of the filter elements 2 into the interior thereof, and any foreign matter or contaminant in the liquid is removed therefrom. The liquid which has passed through the filter elements 2 then flows down through the filter elements and is collected in the collecting tubes 5 to be transferred outward for further treatment or process.

Figures 3, 4, 5:
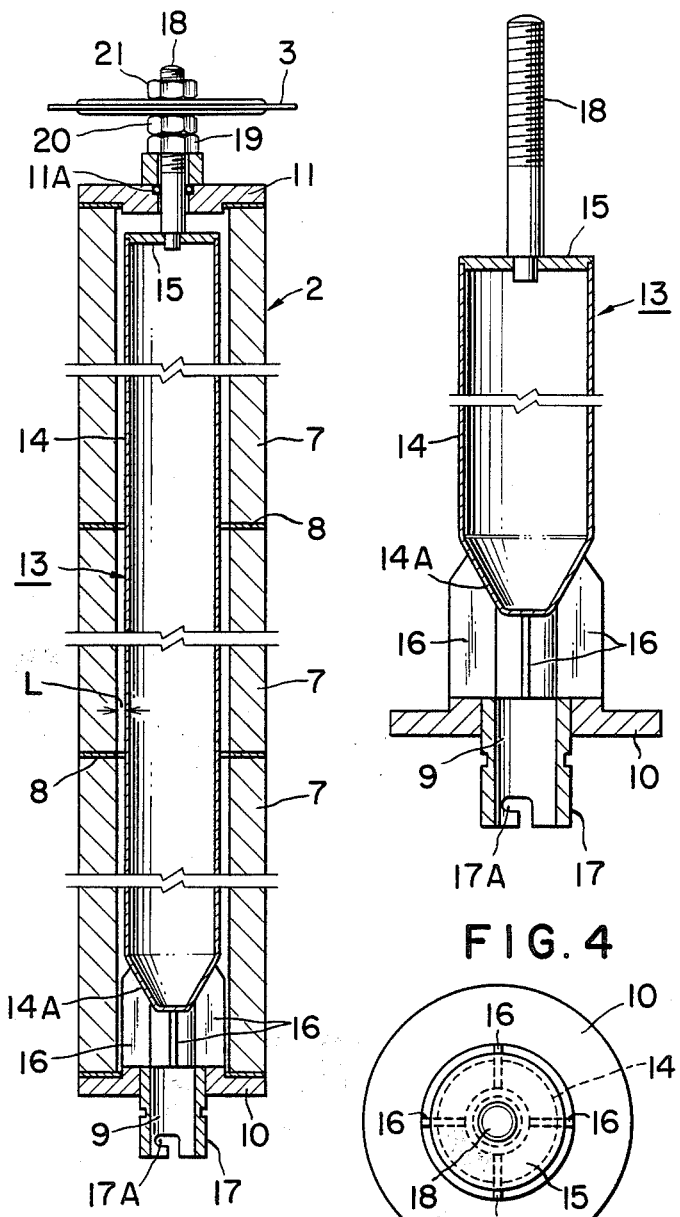
FIG. 3 is a longitudinal section of the filter element shown in FIGS. 1 and 2.
FIG. 4 is a longitudinal section of a hollow capsule member taken out from the filter element 2 shown in FIG. 3.
FIG. 5 is a plan view of the filter element in FIG. 4.

Next, referring to FIGS. 3, 4 and 5, a filter element 2 for use in the filter apparatus in accordance with this invention includes a plurality of elongate cylindrical filter sections or units 7 which are combined together coaxially and end-to-end in the longitudinal direction with a gasket 8 interposed between each adjoining two cylindrical filter units 2. On top of the filter element 2 is provided a top end cap 11, and at the bottom end is provided a bottom end cap 10. The filter element 2 further houses a bulking or displacement member 13 for reducing the internal space within the element 2.

As shown in longitudinal section in FIG. 3, the displacement member 13 is longitudinally elongated and has a cylindrical body 14. The lower portion 14A thereof is substantially tapered, converging and terminating at a generally flat horizontal bottom end face which is completely sealed. The top end of the cylindrical body 14 is closed by a top end lid 15. To the bottom of the tapered portion 14A of the displacement member 13 is connected a plurality of vertical support legs 16. The support legs 16 are formed integrally with the bottom end cap 10 having a communicating aperture 9 for the filter element 2.

Further, in the aperture 9 at the center of the bottom end cap 10 is fitted a tubular outlet fitting 17 for draining the filtrate from the filter element 2 into the collecting tube 5. The outlet fitting 17 extends downwardly from the bottom end cap 10 and substantially perpendicular thereto and is provided with a side cutout 17A for a bayonet junction with a connecting portion 5A of the collecting tube 5. Although a bayonet junction is used as a means for connecting the communicating tube 17 to the collecting tube 5, other appropriate connection means may be employed. It should be understood with respect to this embodiment of the invention that, for the purpose of reducing flow resistance, the bottom portion of the cylindrical body 14 decreases its external diameter or tapers convergently toward the bottom, terminating with a flat circular end face.

To the top end lid 15 is integrally fixed a threaded rod 18 which extends upward and substantially perpendicular thereto. As shown in FIG. 3, the threaded rod 18 extends upward through and beyond an aperture in the top end cap 11 with a sealing member 11a provided over the aperture for prohibiting escape of the filtrate and entry of the yet-to-be-filtered liquid. At the time of mounting of the filter element 2, the threaded rod 18 is inserted upward through a hole in the support plate 3.

A set of three nuts 19, 20 and 21 are in screw engagement with the rod 18 over the sealing member 11A, with the nut 19 directly exerting compression upon the sealing member 11a, the nut 20 being above the nut 19, and the nut 21 being disposed in the uppermost position above the support plate 3. By screwing the nuts 19 and 20, the displacement member 13 is pulled upward, while the top end cap 11 is pushed downward, the bottom end cap 10 also being pulled upward. Thus, a suitable compression is applied on the cylindrical filter units 7.

The support plate 3 is fixed to the tank 1a or any other appropriate portion of the filter apparatus 1. By tightening the nut 21 over the support plate 3, the filter assembly 2 is securely fixed to the support plate and therefore relative to the filter apparatus 1.

The ratio of the cross-sectional area of the displacement member 13 considered as a solid cylinder to the cross-sectional area of space enclosed by the inner wall surface of the cylindrical filter unit 7 is from approximately 65 percent to 85 percent, more desirably from 70 percent to 80 percent. Consequently, if the inner diameter of the cylindrical filter unit 7 is 70 mm, the outer diameter of the displacement member 13 should be 60.5 mm, with a radial clearance therebetween of 4.75 mm.

The operation of the filtering element 2 for use in the filter apparatus will next be considered in detail. During a filtering process, as the liquid surface level ascends, the liquid to be filtered permeates through the perforated surface of the cylindrical filter units 7 leaving contaminants or foreign matter behind on the outside surface. Once inside, the flow velocity of the filtrate increases due to the fact that the cross sectional area of the clearance between the displacement member 13 and the inner wall surfaces of the filter units is small. The filtrate flows down along the clearance, reaches the bottom end cap 10 and exits through the aperture 9 of the outlet fitting 17. The filtrate from individual filter element 2 is accumulated in the collecting pipe 5 and is transferred outward. In the above described process, the filtrate flows down along the displacement member 13 at such a rapid rate that the substances, such as enzymes, do not deposit upon and adhere to the inner surface of the filter units 7.

On the other hand, during the backwashing operation, the air or the liquid under pressure which is fed from the collecting pipe 5 travels upward along the clearance L and permeates through the cylindrical filter units 7. Upon permeation, the air or the liquid under pressure removes the filter cake deposited upon the external surface of the filter element. It should be added that because the clearance L is small the cleaning air or the liquid can apply equal pressure in a short period of time throughout the filter elements 2, and even with a relatively low pressure, cleaning can be accomplished with respect to the upper portion of the filter elements.

Further, no air is trapped in the filter units. In addition, since the clearance L is small, air-drawing prior to the filtering operation can be finished very efficiently and quickly, even with a relatively small drawing pressure. The quantity of air and the liquid required for the cleaning operation has been substantially reduced, and the time needed has also been substantially shortened.

While the invention has been illustrated and described as emodied in a structure of a filter element for use in a filter apparatus, it is not intended to be limited to the details described above and shown in the drawings since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A filter element for use in a filter apparatus, comprising:
    a plurality of cylindrical filter units having perforated surfaces for removal of contaminants from a fluid to be cleaned, said filter units being coaxially aligned and held end-to-end in the axial direction thereof to form an integral tubular structure, which has top and bottom openings at upper and lower ends thereof;
    a top end cap provided over the top opening for tight sealing thereof and having support means for the tubular structure;
    a bottom end cap provided over the bottom opening for tight sealing thereof, said bottom end cap having a central aperture for passage therethrough of said fluid after filtration thereof; and
    a cylindrical displacement member disposed coaxially within said tubular structure between the top and bottom end caps, a small clearance being left between the displacement member and the inner wall surface of the tubular structure, said cylindrical displacement member being a hermetically enclosed hollow cylindrical body connected to the top and bottom end caps so as to function to couple and pull together the two end caps and apply a compressive force to said filter units, whereby a fluid can flow radially inwardly through the filter units and out through the bottom end cap.

2. A filter element for use in a filter apparatus as set forth in claim 1 in which the ratio of the cross sectional area of the displacement member to the cross sectional area of the interior space of the tubular structure is in the range of from 0.65:1 to 0.85:1.

3. A filter element for use in a filter apparatus as set forth in claim 1 in which the displacement member has a generally inverted conical bottom portion.

4. A filter element for use in a filter apparatus, comprising:
    a plurality of cylindrical filter units having perforated surfaces for removal of contaminants from a fluid to be cleaned, said filter units being coaxially aligned and held end-to-end in the axial direction thereof to form an integral tubular structure which has top and bottom openings at upper and lower ends thereof;
    a top end cap having an aperture and provided over the top opening for tight sealing thereof;
    a bottom end cap provided over the bottom opening for tight sealing thereof, said bottom end cap having a central aperture for passage therethrough of said fluid after filtration thereof; and
    a cylindrical displacement member disposed coaxially within said tubular structure between the top and bottom end caps, said displacement member having a generally inverted conical bottom portion and a small clearance being left between the displacement member and the inner wall surface of the tubular structure, the cylindrical displacement member being connected to said top and bottom end caps so as to function to couple and pull together the two end caps and apply a compression force to the filter units, said conical bottom portion having a plurality of longitudinally extending support legs fixed thereto and also integrally fixed to the bottom end cap.

5. A filter element for use in a filter apparatus as set forth in claim 4 in which the displacement member has, at the upper end thereof, a top end lid provided integrally with a threaded rod which extends longitudinally through said aperture of the top end cap, a nut being screwed thereonto and wherein the displacement member is fixed within the tubular structure by the nut tightly screwed onto the threaded rod.

* * * * *